United States Patent
Sobeski et al.

(10) Patent No.: US 6,304,879 B1
(45) Date of Patent: Oct. 16, 2001

(54) DYNAMIC DATA CACHE FOR OBJECT-ORIENTED COMPUTING ENVIRONMENTS

(75) Inventors: David A. Sobeski, Redmond; Felix G. T. I. Andrew, Seattle, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/200,674

(22) Filed: Nov. 25, 1998

(51) Int. Cl.[7] ................................................. G06F 17/30
(52) U.S. Cl. ............................................. 707/103; 707/100
(58) Field of Search ................................. 707/103, 100, 707/101, 102, 104; 714/15; 711/138, 113, 118, 142, 143

(56) References Cited

U.S. PATENT DOCUMENTS

| | | | |
|---|---|---|---|
| 5,469,555 | * 11/1995 | Ghosh et al. | 711/133 |
| 5,524,234 | * 6/1996 | Martinez, Jr. et al. | 711/141 |
| 5,594,886 | * 1/1997 | Smith et al. | 711/136 |
| 5,608,909 | 3/1997 | Atkinson et al. | 395/703 |
| 5,625,794 | * 4/1997 | Inoue et al. | 711/138 |
| 5,692,187 | 11/1997 | Goldman et al. | 395/619 |
| 5,740,455 | 4/1998 | Pavley et al. | 395/777 |
| 5,787,442 | 7/1998 | Hacherl et al. | 707/201 |
| 5,815,648 | * 9/1998 | Giovannetti | 714/15 |
| 5,892,949 | 4/1999 | Noble | 395/704 |
| 5,951,680 | 9/1999 | Redlin et al. | 713/1 |
| 5,956,508 | 9/1999 | Johnson et al. | 395/683 |
| 6,101,500 | 8/2000 | Lau | 707/103 |
| 6,104,963 | 8/2000 | Cebasek et al. | 700/86 |

FOREIGN PATENT DOCUMENTS

| | | | |
|---|---|---|---|
| 0660231 | 12/1994 | (EP) | G06F/9/44 |
| 0817037A | 6/1996 | (EP) | G06F/9/46 |
| 0762273 | 9/1996 | (EP) | G06F/9/44 |
| 0833259A | 9/1996 | (EP) | G06F/17/30 |
| 0757313 | 2/1997 | (EP) | G06F/9/44 |
| 98/21651 | 11/1996 | (WO) | G06F/9/44 |

OTHER PUBLICATIONS

Hwang et al., On–Chip Cache Memory Resilience, IEEE, High–Assurance Systems Engineering Symposium, Proceedings. third IEEE International, pp. 240–247, Nov. 1998.*
Edenfield et al., The 68040 On–Chip Memory Subsystem, Thirty–Fifth IEEE Computer Society International Conference, pp. 264–269, Mar. 1990.*
Mekhiel et al., Performance Analysis for a Cache System with Different DRAM Designs, Electrical and Computer Engineering, pp. 365–368, Nov. 1998.*
International Search Report—PCT/US 99/24357, 4 pages, (Mar. 14, 2000).
International Search Report—PCT/US 99/24358, 4 pages, (Mar. 14, 2000).
International Search Report—PCT/US 99/24343, 4 pages, (Mar. 14, 2000).
Box, D., "Essential COM", *1997* (*ISBN 0–201–63446–5*), pp. 1–420, (1997).

(List continued on next page.)

*Primary Examiner*—Thomas Black
*Assistant Examiner*—Frantz Coby
(74) *Attorney, Agent, or Firm*—Christensen O'Connor Johnson Kindness PLLC

(57) ABSTRACT

Dynamic data caching for object-oriented environments. In one embodiment, a system having a container and external objects, the container having a data object, a data cache object, internal objects and a controller object. The data object has static properties. The data cache object provides for access to the data object, and temporarily stores dynamic properties for the data object. The controller object provides for access to the data cache object.

19 Claims, 5 Drawing Sheets

OTHER PUBLICATIONS

IBM, "Heterogeneous object model–view relationships", *IBM Technical Disclosure Bulletin*, vol. 33, No. 68, 242–243, (Nov. 1, 1990).

IBM, "Highly Flexible Property Abstraction Framework of Non–restricted System Object Model Objects", *IBM Technical Disclosure Bulletin*, vol. 37, No. 9, XP000473417, 287, (Sep. 1, 1994).

IBM, "Objects with Multi–Personality", *IBM Technical Disclosure Bulletin*, vol. 37, No. 9, 661, (Sep. 1, 1994).

Ishimaru, T., et al., "An Object–Oriented Data Model for Multiple Representation of Object Semantics", *Systems & Computers in Japan, Scripta Technica Journals, NY*, vol. 27, No. 9, 23–32, (Aug. 1, 1996).

Jaaksi, A., "Implementing Interactive Applications in C++", *Software Practice & Experience, GB, John Wiley &Sons Ltd. Chichester*, vol. 25, No. 3, 271–289, (Mar. 1, 1995).

Lin, L., et al., "Dynamic window configuration in an object oriented programming environment", *Proceedings of the Annual Int'l computer Software & Applications Conf., IEEE, Comp, Soc. Press*, vol. Conf. 13, 381–388, (1989).

Taylor, D.A., "Object Technology: A Manager's Guide", (*2d ed. 1997*) (*ISBN 0–201–30994–7*), pp. 1–198, (1997).

International Search Report—PCT/US 00/06727, 8 Pages, (Aug. 9, 2000).

Hamilton, G., "JavaBeans 1.01 specification", *Sun Microsystems, XP002130316, Mountain View, CA*, 40–52, (Jul. 24, 1994).

IBM, "Linking the slot values of difference objects", *IBM Technical Disclosure Bulletin*, vol. 38, No. 7, XP000521684, 261, (Jul. 24, 1994).

Rumbaugh, J., "Controlling propagation of operations using attributes on relations", *Proc. of the Object oriented programming systems languagues and applications conf., XP000299836*, 285–296, (Sep. 25, 1988).

* cited by examiner

DYNAMIC DATA CACHE FOR OBJECT-ORIENTED COMPUTING ENVIRONMENTS

RELATED APPLICATIONS

This application is related to the following applications, which are hereby incorporated by reference: U.S. Pat. Application No. 09/200,469, titled "Object Model for Object-Oriented Computer Environments," filed Nov. 25, 1998, and U.S. Pat. Application No. 09/199,604, titled "Dynamic Object Behavior for Object-Oriented Computer Environments," filed Nov. 25, 1998.

FIELD OF THE INVENTION

This invention relates generally to object-oriented computing environments, and more particularly to a dynamic data cache for such environments.

BACKGROUND OF THE INVENTION

Object-oriented programming environments are currently the standard environment in which computer programs are developed. For example, within the Microsoft Windows operating system, programs may be developed using the Component Object Model (COM) architecture. Object-oriented programming environments provide a modular manner by which developers can develop complex and sophisticated computer programs.

Generally, an object may include data and methods by which that data is accessed and changed. Thus, new methods may be added to the object for accessing and changing the data in other ways not previously possible, without affecting existing methods, and the external objects that rely on these existing methods. Upon receiving a message, or in response to an event, an object typically executes a particular method, resulting in the data within that object being retrieved or changed.

SUMMARY OF THE INVENTION

The invention provides for dynamic data cache for object-oriented environments. In one embodiment, a system includes at a container and at least one external object. The container includes a data object, a data cache object, at least one internal object, and a controller object. The container may also be termed a control (as opposed to a controler), or a form. The data object has at least one static property. The data cache object provides for access to the data object, and also is able to temporarily store at least one dynamic property for the data object. The controller object provides for access to the data cache object, via messages and/or events. Both the internal and external objects are able to access both the static and dynamic properties of the data object (via the controller object communicating with the data cache object). Thus, in one embodiment of the invention, the dynamic data cache is dynamic in that it is able to store dynamic properties for the data object. The dynamic data cache in one embodiment is dynamic in another sense: storing changes of the state of the properties of the object, which are not committed to the data itself until desired. Thus, the dynamic nature of the dynamic data cache in this sense relates to the fact that the state of the properties of the object can change over time, such that these state changes are maintained by the cache, and not committed back to the data itself until the cache is so instructed. Therefore, the dynamic data cache is dynamic in nature in two different manners, in one embodiment of the invention.

The dynamic data caching of the invention provides for advantages not found in the prior art. For example, internal and external objects of the container are able to create and access new (temporary) dynamic properties of the data object, which are accommodated by the data cache object. This is accomplished by these objects communicating with the controller object, which itself communicates with the data cache object. Thus, the dynamic data cache object provides both internal and external access to the static and dynamic properties of the data object, where external and internal objects communicate with the dynamic data cache object through the controller object).

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, methods, in accordance with embodiments of the invention, are provided. Finally, in the fourth section, a conclusion of the detailed description is provided.

Hardware and Operating Environment

Figure 1:
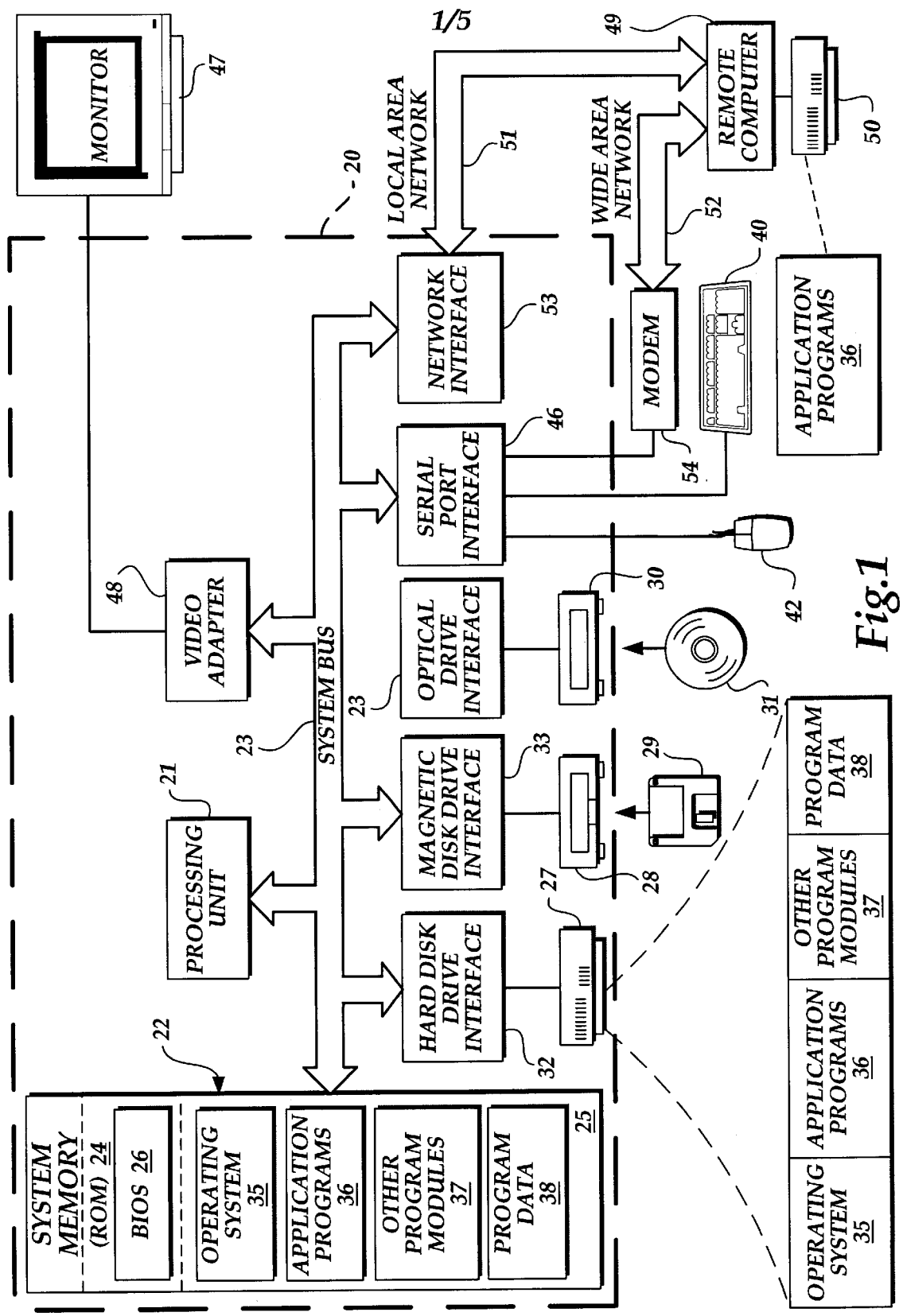
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
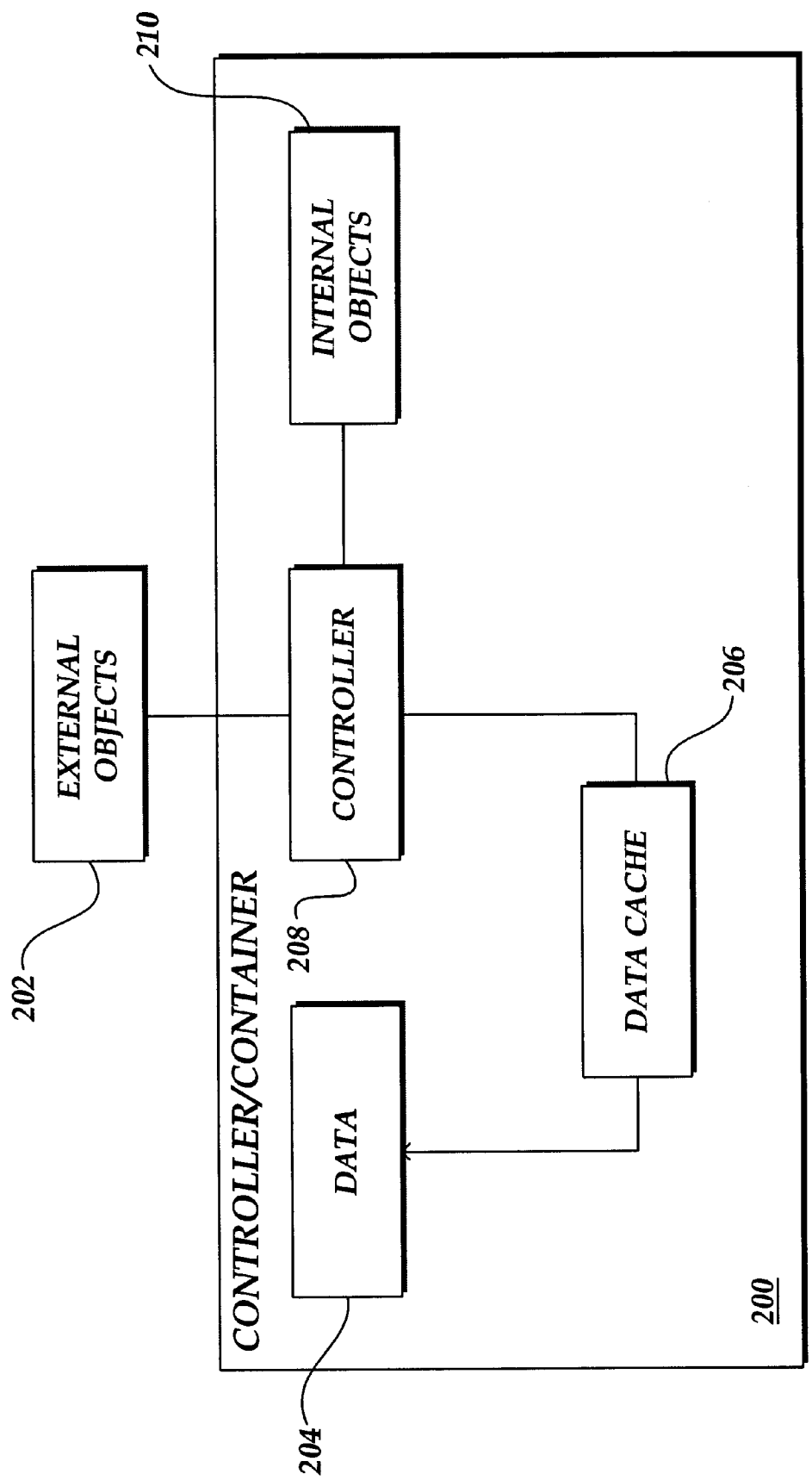
FIG. 2 shows a block diagram of a system according to one embodiment of the invention.

In this section of the detailed description, a description of a computerized system according to an embodiment of the invention is provided. The description is provided by reference to FIG. 2. Referring now to FIG. 2, a system according to an embodiment of the invention is shown. The system includes a container object 200 (also referred to as a control, as opposed to a controller), and one or more external objects 202. The container object 200 includes a data object 204, a data cache object 206, a controller object 208, and one or more internal objects 210. Each of these objects can in one embodiment be a Component Object Model (COM) object, for use in programming in conjunction with the Microsoft Windows operating system, although the invention is not so limited.

Data object 204 is the object that stores the data of the container object 200. In one embodiment, such data is stored as properties. The object 204 stores static properties, which are data that is always associated with the object 204 (as opposed to dynamic properties, as will be described). The data cache object 206 is communicatively coupled to the data object 204 and the controller object 208. The data cache object 206 thus is the only manner through which access is able to be made to the data stored in the data object 204. That is, the data cache object 206 is such that all access to the static properties of the object 204 is made through object 206.

In addition, the data cache object 206 temporally stores any dynamic properties for the data object 204 that may have been requested to be added to the data object 204 by other (internal or external) objects. Dynamic properties are data that is not permanently associated with the definition of data object 204, as opposed to static properties that always are. Thus, the data cache object 206 is a mechanism that allows another object to store state and other information, in the form of dynamic properties, that may be of interested to itself and other objects. For example, an object may add a text color property to an object that does not currently have this data. When another objects asks for the properties of this object, it then is able to see that the text color property exists, and to use this information. It is noted that in one embodiment of the invention, external or internal object access to the properties of the object (via the controller object, which itself communicates with the dynamic cache object) is such that the object accessing the property does not itself know—or care—whether the property being accessed is dynamic or static.

The data cache object 206 also acts as a cache for the data object 204. In such an embodiment, the object 206 can have two modes. In a cache mode, all the changes requested by other objects to the data within object 204 are cached in object 206, such that the changes are not made to the permanent data in object 204 until one of these other objects commits its data changes. Furthermore, in a pass-through mode, all the changes requested by other objects to the data within object 204 are immediately passed through to object 206, such that changes are immediately made to the data stored in object 204. This is the default mode in one embodiment of the invention.

In other words, the data cache object 206 maintains what is known in the art as a dirty state. Thus, if a method asks to change the value of data to the already existing value, the data cache object 206 ignores the change. However, if the old value and the new value are different, then the data is marked as dirty—that is, the value stored by object 206 is different than that stored by object 204, and remains that way until the data is committed back to object 204.

Controller object 208 is communicatively coupled to the data cache object 206, the external objects 202, and the internal objects 210. The controller object 208 is the object through which all accesses to the data cache object 206 are made. In one embodiment, such accesses can be by messages sent by other objects, or events that have been preset by objects and that have been triggered. It is noted that the controller object 208 communicates indirectly to the data object 204 through the data cache object 206. Furthermore, other objects, such as external objects 202 and internal objects 210, communicate indirectly to the data cache object 206 through the controller object 208.

The internal objects 210 are part of the container object 200, and are able to access both the static properties of the data object 204 (via the controller object, which is coupled to the data cache object 206), as well as the dynamic properties of the data object 204, as maintained and accommodated by the data cache object 206 (again, via the controller object, which is coupled to the data cache object 206). They are communicatively coupled to the controller object 208. The internal objects 210 can add new (dynamic) properties to the data object 204 by making a request of the controller object 208, which relays the message to the data cache object 206, as well as access dynamic or static properties, again by making an appropriate request to the controller object 208.

The external objects 202 are defined primarily as being external to the container object 200. The objects 202 are communicatively coupled to the container object 200 via the controller object 208. Like the internal objects 210, they are able to access the static and dynamic properties of the object via an appropriate request to the controller object 208 of the container object 200. Thus, the external objects 202 are able to access the static and dynamic properties of the object by making a request to the controller object 208, which itself communicates with the data cache object 206.

The architecture and system described in conjunction with FIG. 2 can be used to formulate many different types of container objects. The invention is not particularly limited. However, two illustrative examples are shown by reference to FIG. 3(a) and FIG. 3(b), which are screen shots of boxes that may be a result of different container objects, according to varying embodiments of the invention.

Figure 3A:
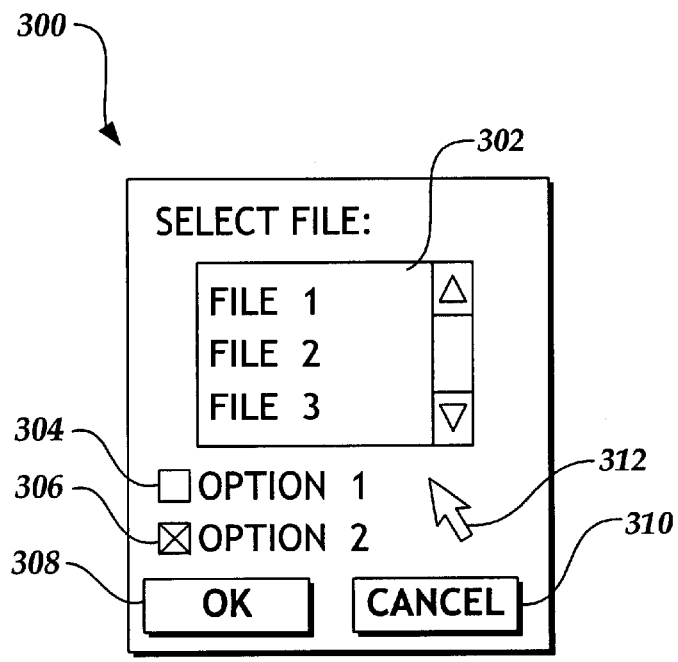
FIG. 3(a) shows a diagram of a screen shot of a box in accordance with an embodiment of the invention.

Referring first to FIG. 3(a), box 300 is a select file dialog box, that includes a file selection area 302, option check boxes 304 and 306, an OK button 308, and a cancel button 310. Examples of such dialog boxes are known within the art. Thus, a user moves the pointer 312 to select the desired file shown in file area 302 (including using the scrolling buttons or bar if desired), checks the desired options via check boxes 304 and 306, and then clicks on the OK button 308 to relay these selections. Alternatively, the user has the option of clicking the cancel button 310 to cancel the operation.

Thus, a container object for such an embodiment of the invention may encompass the entire dialog box. Internal objects for such a container may include the individual internal objects for each of the file area 302, each of the option check boxes 304 and 306, as well as the OK button 308 and the cancel button 310. Assuming that the data cache object of such an object is operating in cache mode, the user is able to make selections within the file area 302, click and/or unclick the option check boxes 304 and 306, etc., all of which cause the data within the data cache object to change.

However, the data in the data object does not change until the user clicks on the OK cancel button 308, which causes the internal object associated with this button to commit the changes made to the cache object to the data object. Conversely, if the user clicks on the cancel button 310, then the internal object associated therewith instructs the cache object not to commit any changes that have been made. The internal objects in the embodiment of FIG. 3(a) can be referred to as displayer objects, or displayers, in that the cause the display of information.

Figure 3B:
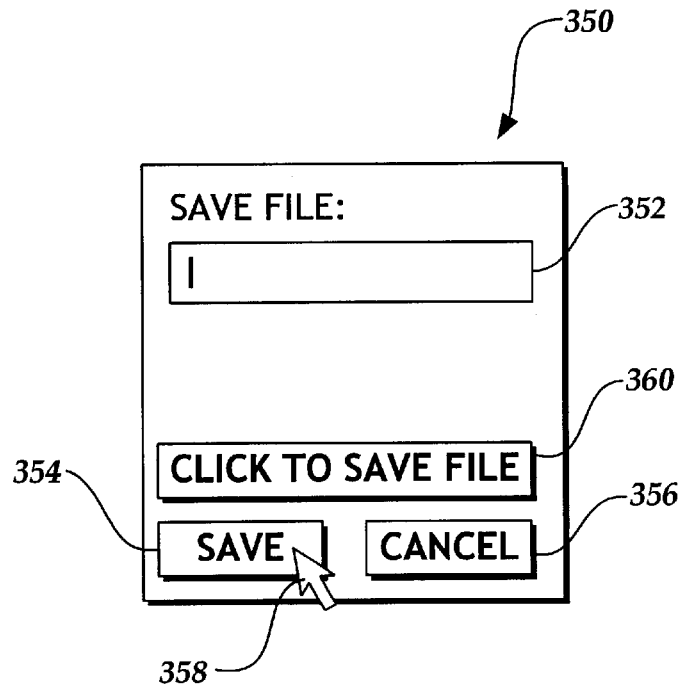
FIG. 3(b) shows a diagram of a screen shot of another box in accordance with an embodiment of the invention.

Referring next to FIG. 3(b), box 350 is a save file dialog box, that includes a file name entry area 352, a save button 354, and a cancel button 356. Examples of such dialog boxes are known within the art. Thus, a user, after entering in the desired file name in area 352, moves the pointer 358 over save button 354, and clicks to register the entered file name—that is, to commit the file name that has been entered in the data cache object of this container object to the data object.

In particular, however, when the pointer 358 is moved over the save button 354, a tool tip banner 360 is displayed, to indicate to the user particular instructions as to the save button 354. In such an instance, the internal object related to the save button 354 may have previously created a tracking dynamic property to the container object (viz., to the data object thereof), which is in actuality maintained by the data cache object. Once this dynamic property has been added directly to the data cache object, the internal object related to the save button 354 is able to change the data of the property—i.e., the text of the tool tip banner 360 (click to save file, as shown in FIG. 3(b)).

Thus, dynamic properties such as this tracking dynamic property may be added to the data object, without interfering with the manner by which other objects interface with the data object. This is because the data cache object in actuality stores the data regarding the added dynamic property. Once any changes made to the container object are committed, the dynamic property information is lost; that is, unlike static property information, it is not saved in the data object of the container object.

It is noted that as to the embodiments of the invention described in conjunction with FIG. 2 and FIGS. 3(a) and 3(b), the objects can in one embodiment be stored on a computer-readable storage medium, such as a floppy disk or a compact-disc read-only-memory (CD-ROM). In another embodiment, the objects as data representing them and residing in a memory of a computer, executed by the processor thereof. The invention is not particularly limited, however.

Methods

In this section of the detailed description, methods according to an embodiment of the invention is presented. This description is provided in reference to FIGS. 4(a) and 4(b). The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Figure 4A:
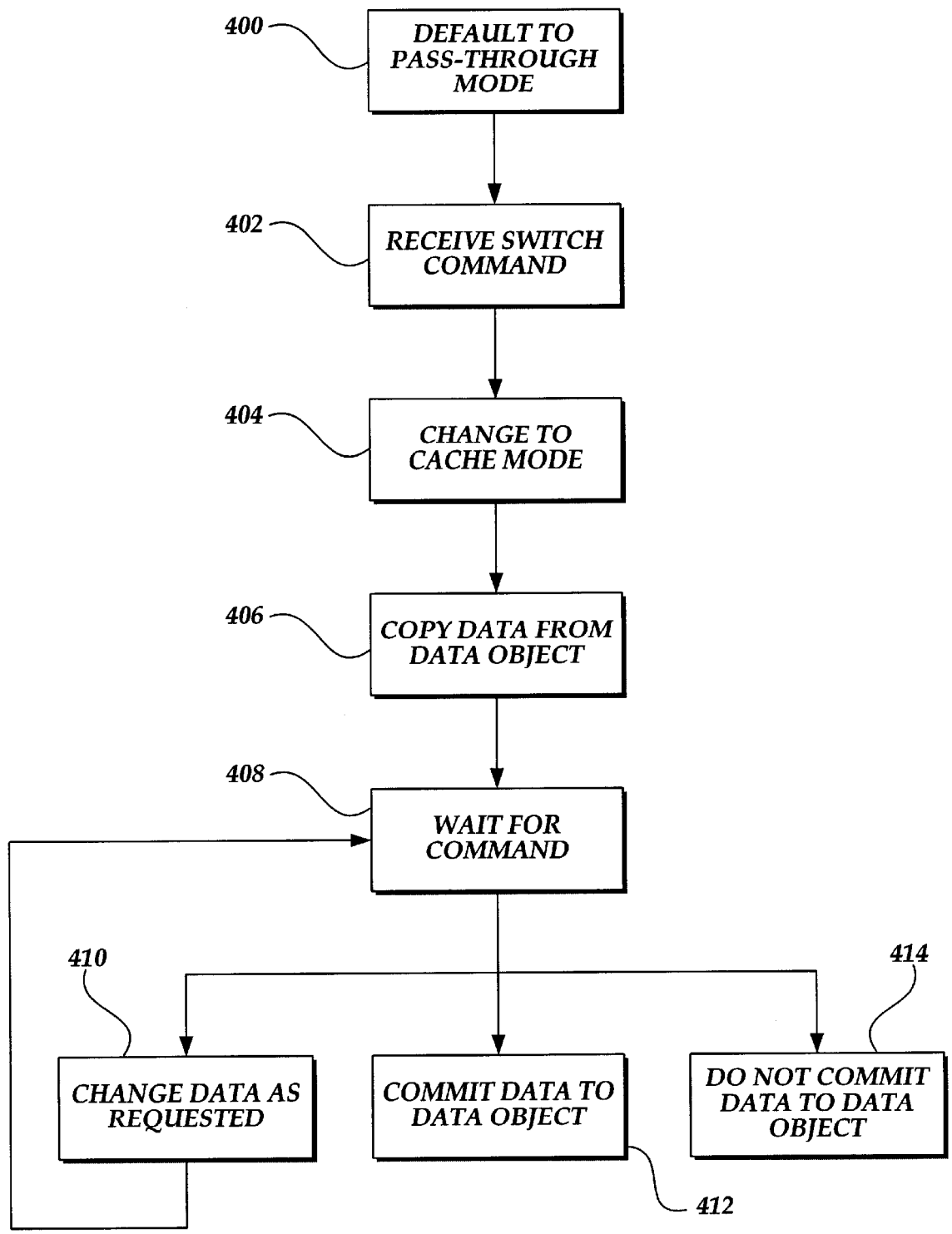
FIG. 4(a) shows a flowchart illustrating a method according to one embodiment of the invention; and, FIG. 4(b) shows a flowchart illustrating another method according to one embodiment of the invention.

Referring first to FIG. 4(a), a flowchart of a method according to one embodiment of the invention is shown. The method of FIG. 4(a) illustrates the manner by which a dynamic data cache (such as the cache object described in the previous section) operates, according to one embodiment. In 400, the cache defaults to a pass-through mode, in which data changes made to static properties automatically pass through the cache to immediately change the data stored in a data object with which the cache is associated. In 402, the cache receives a switch command, to switch the cache from pass-through mode to cache mode. This change is made in 404. Upon entering pass-through mode, the cache copies the initial values of the static properties stored in the data object into the cache in 406. In another embodiment of the invention, no copies are made. All unmodified static properties are obtained from the data object. Otherwise, the value in the cache is used. When a change is made to a property in this embodiment, it is stored in the cache.

Thereafter, changes requested to be made of the data of the static properties of the data within the data object are in actuality made only to the data stored in the cache. In 408, the cache waits for a command. If it is some type of change data command, then control proceeds to 410, where the data is changed as requested, but only to the data as stored in the cache, not in the actual data object. If the command is a commit data command, then the cache commits the changed data to the data object in 412, by copying the data as changed in the cache to the data object, overwriting the original values in the data object. Finally, in 414, if the command is a do not commit data command (i.e., a cancel or discard command), then the changed data in the cache is not copied to the original data object.

Figure 4B:
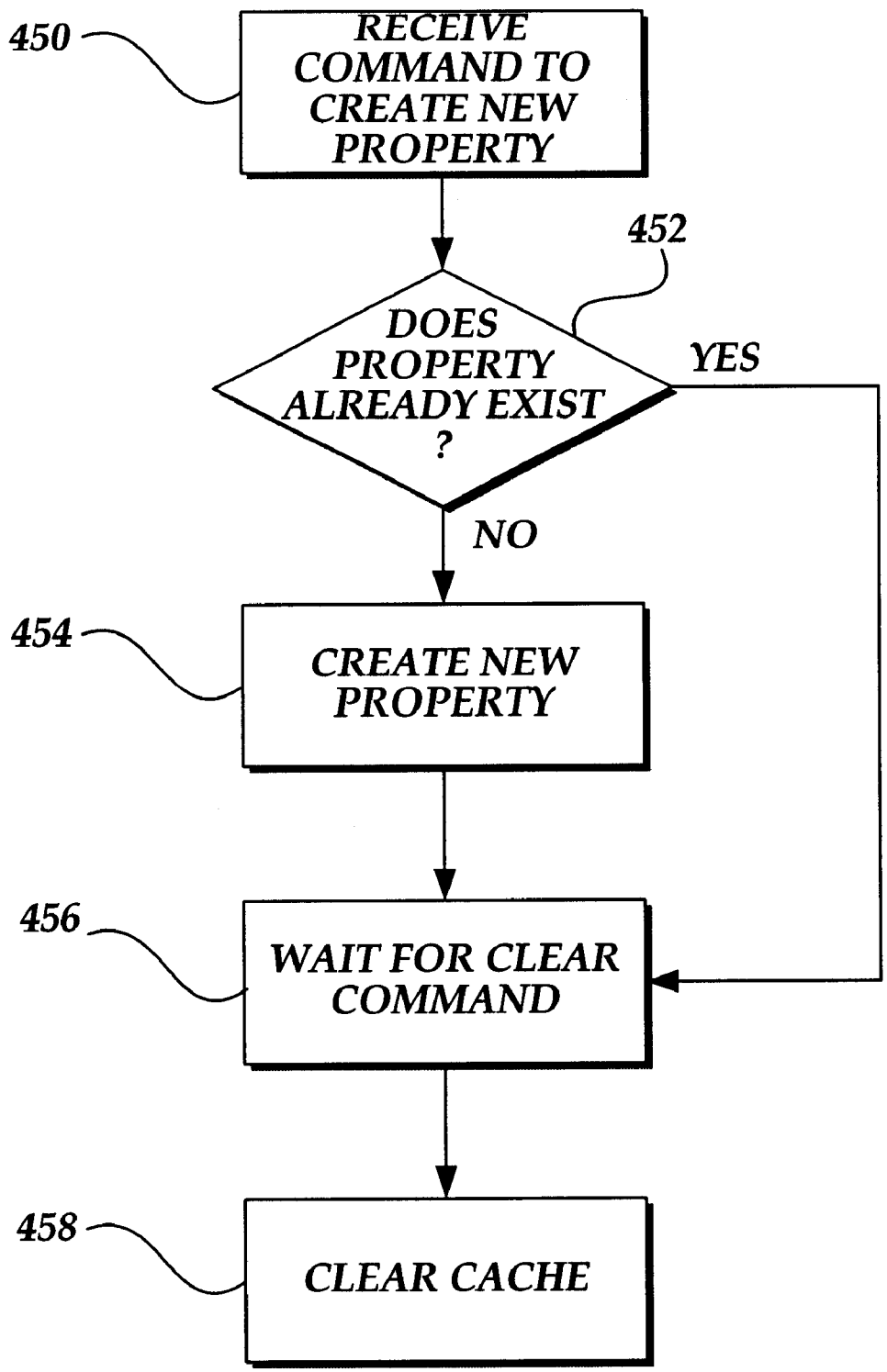

Referring next to FIG. 4(b), a flowchart of another method according to one embodiment of the invention is shown. The method of FIG. 4(b) may be performed in one embodiment after or before (that is, in conjunction with) the method of FIG. 4(a). The method of FIG. 4(b) illustrates the manner by which a dynamic data cache (such as the cache object described in the previous section) receives a dynamic (new) property. In 450, a command to create a new dynamic property for a data object is received by the cache. In 452, the cache determines if the new dynamic property already exists. If it does, then control proceeds to 456.

If the property does not already exist, however, then in 454, the cache creates the new property. Note that data change commands regarding the dynamic property are made in the cache itself; the data object, in other words, does not actually store the data regarding the dynamic property. In 456, the cache waits to receive a clear command, such that in 458, the cache clears the dynamic property and the data regarding the property from its memory.

Conclusion

Dynamic data caching has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system comprising:
   a container object comprising
      a data object having at least one static property,
      a data cache object through which all access to the at least one static property of the data object is made and to temporarily store at least one dynamic property for the data object,
      a controller object through which all access to the data cache object is made via at least one of messages and events,
      at least one internal object to access the at least one static property and the at least one dynamic property; and
   at least one external object to access the at least one static property and the at least one dynamic property, wherein the external object is external to the container object, and wherein the container object, the data object, the data cache object, the controller object, the at least one internal object, and the at least one external object all comprise respective encapsulated data and a respective method for accessing the respective encapsulated data in an object-oriented computing environment.

2. The system of claim 1, wherein the data cache object has a cache mode in which all changes made to the at least one static property are cached until committed to the data object.

3. The system of claim 2, wherein the data cache object further has a pass-through mode in which all changes made to the at least one static property are automatically reflected back to the data object.

4. The system of claim 3, wherein the data cache object defaults to the pass-through mode.

5. A container object comprising:
   a data object having at least one static property;
   a data cache object through which all access to the at least one static property of the data object is made and to temporarily store at least one dynamic property for the data object; and,
   a controller object through which all access to the data cache object is made via at least one of messages and events, wherein the container object, the data object, the data cache object, and the controller object all comprise respective encapsulated data and a respective method for accessing the respective encapsulated data in an object-oriented computing environment.

6. The container object of claim 5, further comprising at least one internal object to access the at least one static property and the at least one dynamic property.

7. The container object of claim 5, wherein the data cache object has a cache mode in which all changes made to the at least one static property are cached until committed to the data object.

8. The container object of claim 7, wherein the data cache object further has a pass-through mode in which all changes made to the at least one static property are automatically reflected back to the data object.

9. The container object of claim 8, wherein the data cache object defaults to the pass-through mode.

10. A method comprising:
    receiving a command to create a new property for a data object; and,
    upon receiving the command to create the new property, creating the new property within a data cache object such that data regarding the new property is accessible to and changeable by only internal objects, wherein the data object and the data cache object both comprise respective encapsulated data and a respective method for accessing the respective encapsulated data in an object-oriented computing environment.

11. The method of claim 10, further comprising:
    copying data from a data object to a data cache object;
    receiving a command;
    upon the command comprising a change data command, changing the data in the data cache object; and,
    upon the command comprising a commit data command, copying the data from the data cache object to the data object.

12. The method of claim 11, further initially comprising:
    defaulting to a pass-through mode in which a received command comprising a change data command results in changing the data in the data object; and,
    upon receiving a command comprising a switch command, changing to a cache mode.

13. A computer comprising:
    a processor;
    a memory; and,
    data residing in the memory for execution by the processor and representing:
       a container object comprising
          a data object having at least one static property,
          a data cache object through which all access to the at least one static property of the data object is made and to temporarily store at least one dynamic property for the data object, and,
          a controller object through which all access to the data cache object is made via at least one of messages and events; and,
       at least one external object to access the at least one static property and the at least one dynamic property, wherein the at least one external object is external to the container object, and wherein the container object, the data object, the data cache object, the controller object, and the at least one external object all comprise respective encapsulated data and a respective method for accessing the respective encapsulated data in an object-oriented computing environment.

14. A computer-readable storage medium for execution on a computer and storing data representing:
    a container object comprising
       a data object having at least one static property,
       a data cache object through which all access to the at least one static property of the data object is made and to temporarily store at least one dynamic property for the data object, and,
       a controller object through which all access to the data cache object is made via at least one of messages and events; and,
    at least one external object to access the at least one static property and the at least one dynamic property, wherein the at least one external object is external to the container object, and wherein the container object, the data object, the data cache object, the controller object, and the at least one external object all comprise respective encapsulated data and a respective method for accessing the respective encapsulated data in an object-oriented computing environment.

15. The system of claim 1, wherein the dynamic property is cleared from the data cache object without being stored to the data object.

16. The container object of claim 5, wherein the dynamic property is cleared from the data cache object without being stored to the data object.

17. The method of claim 10, wherein the new property is cleared from the data cache object without being stored to the data object.

18. The computer of claim 13, wherein the dynamic property is cleared from the data cache object without being stored to the data object.

19. The computer-readable storage medium of claim 14, wherein the dynamic property is cleared from the data cache object without being stored to the data object.

* * * * *